US010121157B2

(12) United States Patent
Agarwal et al.

(10) Patent No.: US 10,121,157 B2
(45) Date of Patent: Nov. 6, 2018

(54) RECOMMENDING USER ACTIONS BASED ON COLLECTIVE INTELLIGENCE FOR A MULTI-TENANT DATA ANALYSIS SYSTEM

(71) Applicant: GoodData Corporation, San Francisco, CA (US)

(72) Inventors: Gaurav Vijay Agarwal, Sausalito, CA (US); Jan Vlcek, Bilovice nad Svitavou (CZ); Winston Christie-Blick, San Francisco, CA (US); Michael Štencl, Brno (CZ); Martin Matula, Prague (CZ)

(73) Assignee: GoodData Corporation, San Francisco, CA (US)

( * ) Notice: Subject to any disclaimer, the term of this patent is extended or adjusted under 35 U.S.C. 154(b) by 0 days.

(21) Appl. No.: 14/690,321

(22) Filed: Apr. 17, 2015

(65) Prior Publication Data
US 2016/0307210 A1 Oct. 20, 2016

(51) Int. Cl.
*G06Q 10/00* (2012.01)
*G06Q 30/02* (2012.01)
*G06Q 10/06* (2012.01)
*G06F 3/0484* (2013.01)
*G06F 17/30* (2006.01)

(52) U.S. Cl.
CPC ....... *G06Q 30/0201* (2013.01); *G06F 3/0484* (2013.01); *G06F 17/3053* (2013.01); *G06Q 10/06316* (2013.01)

(58) Field of Classification Search
CPC .............................. G06Q 10/00; G06Q 30/02
USPC .................................................. 705/7.11–7.42
See application file for complete search history.

(56) References Cited

U.S. PATENT DOCUMENTS

2015/0081396 A1\* 3/2015 Miller .......................... 705/7.36

OTHER PUBLICATIONS

PCT International Search Report and Written Opinion, PCT Application No. PCT/US2016/26296, dated Sep. 26, 2016, ten pages.

\* cited by examiner

*Primary Examiner* — Robert D Rines
(74) *Attorney, Agent, or Firm* — Fenwick & West LLP

(57) ABSTRACT

A multi-tenant system stores data for customers. The multi-tenant system presents user interfaces allowing users associated with the customers to perform analysis of data stored for the customer. The multi-tenant system determines recommendations for subsequent user actions that can be performed by a user in a context. The context includes a report being analyzed, a type of visualization of the report, one or more interactions performed by the user with the report, and so on. The multi-tenant system presents one or more widgets based on the recommendations that allow the user to perform the recommended action. The multi-tenant system may determine a recommendation based on past interactions of a subset of users of the multi-tenant system, for example, users associated with a type of industry, users having a particular role in an organization, or a level of experience of the user with analysis of data.

29 Claims, 10 Drawing Sheets

RECOMMENDING USER ACTIONS BASED ON COLLECTIVE INTELLIGENCE FOR A MULTI-TENANT DATA ANALYSIS SYSTEM

FIELD OF INVENTION

This invention relates generally to data analysis and visualization and more specifically to recommending user actions to be taken for performing data analysis and visualization.

BACKGROUND

Businesses collect data representing various aspects of their activities, for example, transactions performed, user interactions with a website of the business, inventory, employee information, and so on. This data is generated by various sources, for example, by systems and applications used by the business, provided by third parties, manually entered, and so on. As an example, a particular system may be used for managing sales of the business, another system may be used for managing inventory, another system for employee information, and so on. Each system or application acts as a data source of information that describes a particular aspect or aspects of the business.

Business experts analyze data from these data sources to make informed business decisions. An executive may analyze the information to make strategic decisions for the business, for example, the amount of resources to be allocated for promoting certain products, type of advertising campaigns to be used for product promotion, and other business decisions. Data coming from a variety of data sources is often complex to analyze. Typically there are complex logical relationships that connect different types of data. Analysis of such data requires understanding of these relationships. Business experts that typically understand these relationships often do not have background in statistics, business intelligence, and/or data visualization.

Conventional tools for performing data analysis and visualization require strong background in statistics, query languages, data visualization techniques, and so on. These sophisticated users of the data analysis tools are referred to as data analysts (or data scientists or data engineers.) Business experts typically provide requirements to the data analysts to perform the data analysis. The data analysts perform the data analysis for the business experts and provide the information.

There is often loss of information as a result of communication gaps between the data analysts and the business experts leading to incorrect reports being generated as a result of data analysts misinterpreting the requirements provided by the business experts or the business experts misinterpreting the reports provided by the data analysts. These errors lead to incorrect data analysis being performed by the business experts that may lead to the business expert making incorrect strategic decisions. Furthermore, conventional systems require the business expert to rely on the data analysts to perform the data analysis for them. Data analysts perform the data analysis without having the context or the expertise that the business experts have. As a result there are long delays in the time that the business expert requests certain information and the time that the data analysts provide the requested information. As a result, the data analyst often becomes a bottleneck in the data analysis process. Often business experts that need to make time sensitive decisions forego the information provided by the data analysts since it arrives too late for use. The business expert may use the information provided by the data analyst for validation or confirmation of their decisions ex post facto. However, the information provided by the data analysts loses its main purpose of guiding the decision making process of the business expert. As a result, conventional data analysis and visualization tools are often inadequate for bridging the gap between data analysts and the business experts or for providing timely information to business experts and do not provide the functionality needed by the users performing the analysis of the business data.

SUMMARY

Embodiments facilitate data analysis by users of a multi-tenant data analysis system by recommending potential user actions that a user can take in a given context while analyzing data. The multi-tenant data analysis system stores data for different customers. Each customer is associated with users that can interact with the multi-tenant data analysis system to perform data analysis. The multi-tenant data analysis system presents a user interface to a user for allowing the user to interact with the multi-tenant data analysis system. The multi-tenant data analysis system monitors interactions of the users of the system. The multi-tenant data analysis system determines recommendations for the user identifying potential user actions that the user can perform in a given context. The context of the data analysis comprises a report associated with a data field selected by a user and/or other factors, for example, a sequence of interactions performed by the user with the multi-tenant data analysis system, the type of visualization of the report, other reports presented along with the given report, and so on. The multi-tenant system sends the recommendations for presentation to the user.

In an embodiment, the multi-tenant data analysis system presents a widget corresponding to each recommendation presented to the user. The widget is configured to allow the user to take the recommended action. Accordingly, the multi-tenant data analysis system may present a plurality of widgets if the multi-tenant data analysis system identifies a plurality of recommended actions. An example of a widget is a drop zone that takes a particular action if a data field or a report is dragged and dropped onto the drop zone. Another example, of a widget is a button that sends a request for the recommended action as a result of the user clicking on the button.

In an embodiment, the multi-tenant data analysis system determines a recommendation score for each recommendation. The recommendation score may be determined based on various factors, for example, the number of users that performed the recommended user action, the rate at which the user action was selected by users when presented in view of matching contexts, and so on.

In an embodiment, the presentation of a widget corresponding to a recommendation is determined based on the recommendation score of that recommendation. The presentation of a widget comprises the appearance of the widget or the position of the widget within the user interface. For example, a widget associated with a higher recommendation score may be displayed as having a larger size, a prominent border, or larger text compared to widgets associated with lower recommendation scores.

In an embodiment, the multi-tenant data analysis system determines recommendations based on past user actions of a subset of user of the multi-tenant data analysis system. The subset of users may be determined based on various criteria including, a type of industry of the customer associated with the user, the role played by the user in the organization of the user, a measure of expertise of the user in performing data analysis, or a measure of experience of the user is performing data analysis using the multi-tenant system.

The features and advantages described in this summary and the following detailed description are not exhaustive. Many additional features and advantages will be apparent to one of ordinary skill in the art in view of the drawings, specification, and claims hereof.

Figure 1:
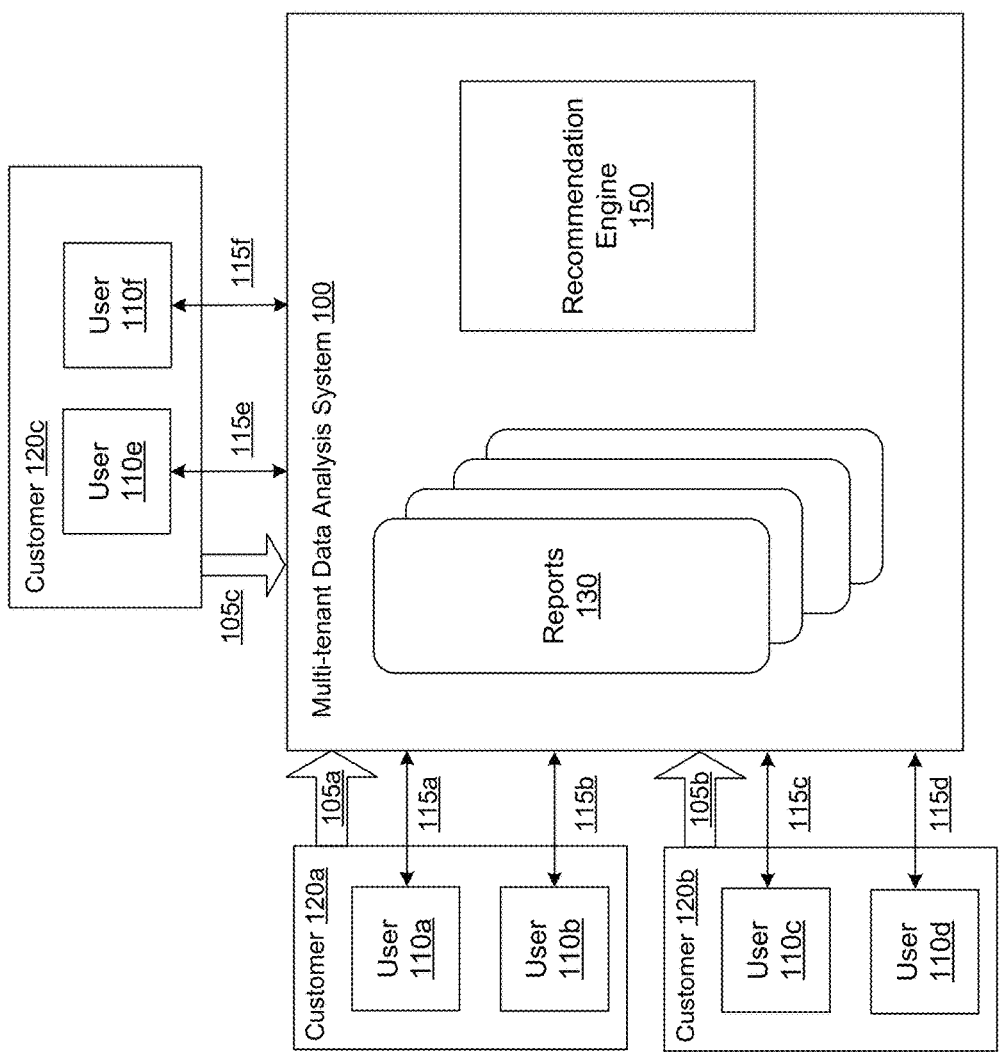
FIG. 1 illustrates overall system environment of a multi-tenant data analysis system that performs recommendations of user actions based on past user actions, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Analytics Applications for Business Intelligence

Business intelligence comprises methodologies, processes, architectures, and technology used to identify and analyze business data. Examples of business data include data of commercial or business value to an organization, project, department, or product; such as data corresponding to profits, sales, gross margin, revenues, customer retention rates, customer lifetime values, customer renewal rates, customer engagement rates, customer satisfaction scores, and the like. Business data may be categorized or segmented based on organizations, departments, projects, products, and so on. In other words, different organizations, departments, projects, and products may have different underlying business data and therefore employ different methods to analyze the underlying business data to produce different results.

Analysis of business data allows an analyst to distil key patterns or statistical trends from the underlying raw data (e.g., trends and patterns not directly obvious from the raw data). The processed output facilitates a viewing user to make speedy and meaningful conclusions from the business data. The processed output may be presented or displayed in the form of a visual user interface (e.g., a report, a dashboard, a collection of charts, and so on) that summarizes key patterns or statistical trends underlying the raw data.

Embodiments of the invention provide recommendations to users performing data analysis so as to facilitate their interactions with the data analysis system. Embodiments determine the context of data analysis of the user including the type of reports that the user is analyzing, the interactions that the user has performed with the reports, the type of visualization being viewed by the user and so on. The data analysis system identifies recommendation of the next action that the user can take in the given context. The recommendation is determined based on past user actions taken by other users of the multi-tenant data analysis system. The past user actions are weighted based on various factors to determine the appropriate recommendation for the user. The recommendation of the next action allows the user to take incremental action and guides the user in the data analysis that the user wants to perform. The recommendation leverages the collective intelligence of the other users of the multi-tenant data analysis system to guide the user actions. In other words the user is made aware of what users in similar context have performed at every step of the data analysis. This is distinct from systems that perform the entire analysis for the user and present the final result to the user thereby taking away the control of the data analysis process from the user. Accordingly, embodiments let the user control the individual steps of the data analysis but simply provide recommendations at each step. A user can chose to ignore the recommendation and perform an action that does not correspond to any of the system provided recommendations.

FIG. 1 illustrates overall system environment of a multi-tenant data analysis system that performs recommendations of user actions based on collective intelligence, according to an embodiment. The collective intelligence refers to past user actions that were performed by users of the multi-tenant data analysis system. The past user actions are referred to as collective intelligence because they represent actions taken by users based on their expertise and experience. If several users perform a particular user action in a given context, the user action represents the collective intelligence of all these users.

The overall system environment comprises a multi-tenant data analysis system 100, one or more customers 120, and one or more users 110 associated with the customers. Other embodiments may include more, less, or different systems than indicated herein. For example, the customers 120 and users 110 interact with the multi-tenant data analysis system 100 via network not shown in FIG. 1. The multi-tenant data analysis system is also referred to herein as multi-tenant system, as a data analysis system, or as a system.

FIG. 1 and the other figures use like reference numerals to identify like elements. A letter after a reference numeral, such as "120*a*," indicates that the text refers specifically to the element having that particular reference numeral. A reference numeral in the text without a following letter, such as "120," refers to any or all of the elements in the figures bearing that reference numeral (e.g. "120" in the text refers to reference numerals "120*a*" and/or "120*b*" in the figures).

The multi-tenant data analysis system 100 stores data of multiple customers. Each customer acts as a tenant of the multi-tenant data analysis system 100 and stores data associated with the customers in the multi-tenant data analysis system 100. A customer is an entity that provides data stored by the multi-tenant data analysis system 100, for example, a business or an organization. A customer may comprise multiple systems that generate, process, and/o store data associated with the customer. For example, a business may include systems that process and store sales information, inventory information, employee information, and so on.

A customer is associated with users that interact with the multi-tenant data analysis system 100 for performing data analysis. For example, a user can be a business expert analyzing data associated with the customer, a data scientist or a data analyst, a developer of reports, or any other user that has the required access to view data of the customer.

The multi-tenant data analysis system 100 configures user interfaces for presenting to the users that allow the user to perform various types of actions or interactions for analyzing the data. The multi-tenant data analysis system 100 monitors the interactions of the different users. The multi-tenant data analysis system 100 uses the observed interaction patterns of different users (based on their past actions) to make recommendations of user actions that a particular user can take in a given context.

For example, a user may perform a sequence of interactions that result in the multi-tenant data analysis system 100 providing certain type of visualization of a data field of the customer. The multi-tenant data analysis system 100 analyzes the sequence of interactions performed by the user and/or the type of report generated by the user based on the sequence of interactions. The multi-tenant data analysis system 100 uses past interactions of other users of the same customer or other customers to identify actions taken by the other users after similar sequences of interactions or when they were presented with similar reports. In an embodiment, the multi-tenant data analysis system 100 represents the sequence of user actions by a data structure that specifies one or more user actions and the order in which the user actions were taken, for example, using an array or any representation of an ordered set.

The multi-tenant data analysis system 100 determines recommendations of actions that the user can take based on the interactions of other users in similar contexts or situations. A context of a user is determined by various factors including, the type of user interface presented to the user, the type of report or data being presented to the user via a client application, or the sequence of interactions performed by the user to generate the data presented to the user via the client application. The multi-tenant data analysis system 100 ranks the recommendations based on various criteria and selects one or more recommendations for presenting to the user. The user can select a recommendation to perform the action recommended based on collective intelligence of other users. As a result, the multi-tenant data analysis system 100 facilitates data analysis by users such as business experts based on the collective intelligence of other users.

In an embodiment, the various systems such as computing systems of the customers or client devices of users interact with the multi-tenant data analysis system 100 using a network (not shown in FIG. 1.) The network may comprise any combination of local area and/or wide area networks, using both wired and/or wireless communication systems. In one embodiment, the network uses standard communications technologies and/or protocols. Data exchanged over the network may be represented using any suitable format, such as hypertext markup language (HTML) or extensible markup language (XML). In some embodiments, all or some of the communication links of the network may be encrypted using any suitable technique or techniques.

The multi-tenant data analysis system 100 receives and stores data from multiple customers. In an embodiment, multi-tenant data analysis system 100 defines a database schema for each customer and stores data received from the customer in the database schema corresponding to the customer. Each customer 120 sends data of the customer 120 to the multi-tenant data analysis system 100 using application programming interface (API) of the multi-tenant data analysis system 100. A customer may send data periodically, for example, monthly, weekly, or daily. The multi-tenant data analysis system 100 receives data from each customer and stores it in a format that allows generation of analytics reports based on the data.

Each customer 120 is associated with one or more users 110 that interact with the multi-tenant data analysis system 100 for performing analysis of data associated with the customer 120. The multi-tenant data analysis system 100 stores data of each customer independent of data of other customers. For example, a user associated with a customer is allowed to access data and reports associated with that particular customer but is denied access to reports and data of other customers. In an embodiment, the multi-tenant data analysis system 100 stores data internally using data representations and data structures that store data of different customers. However, the multi-tenant data analysis system 100 maintains metadata associated with the data and enforces access control that ensures that a user can only access data of a customer associated with the user.

Figure 2:
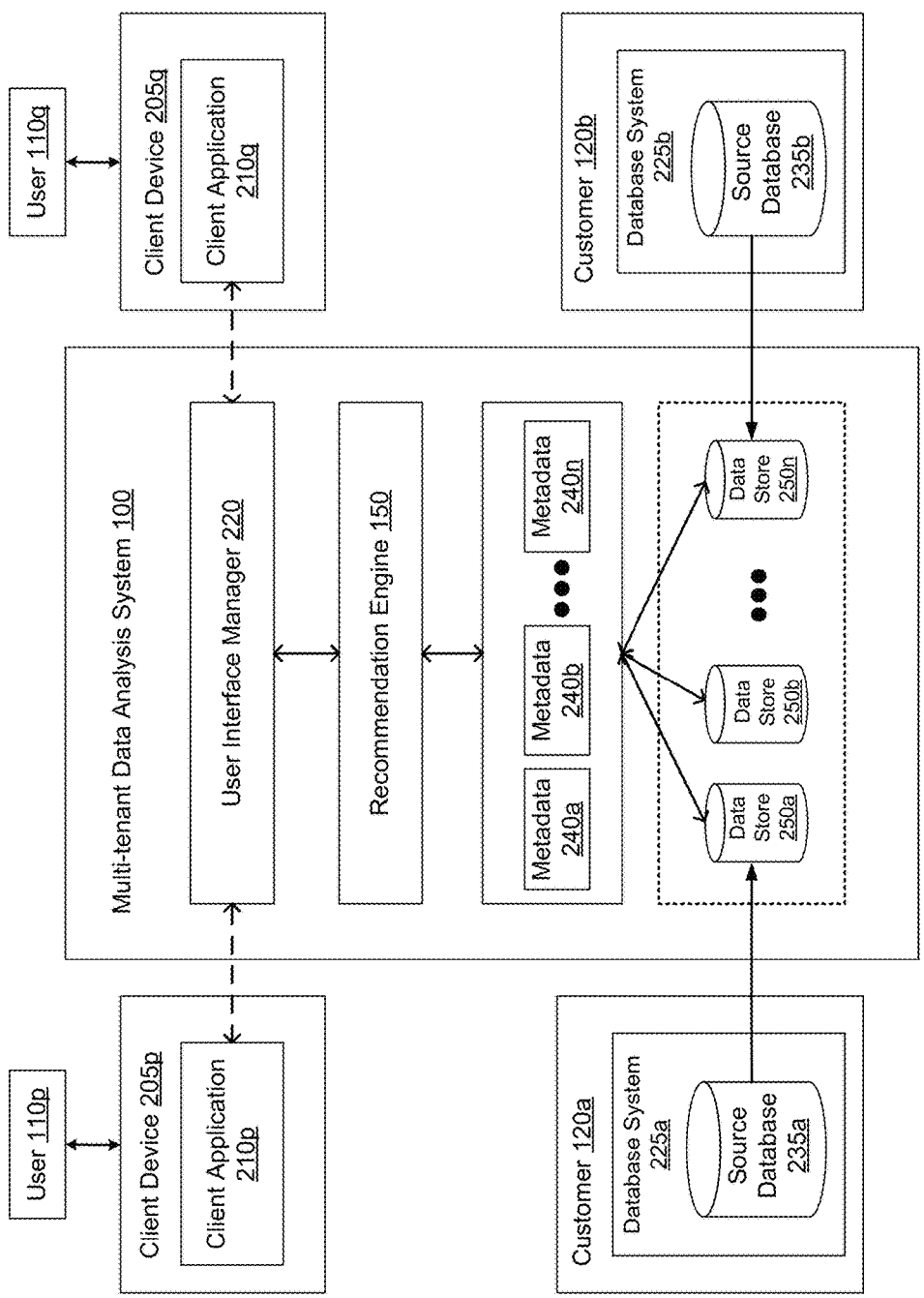
FIG. 2 shows details of various components of the overall system environment of a multi-tenant data analysis system shown in FIG. 1, according to an embodiment.

Users 110 interact with the multi-tenant data analysis system 100 using client devices as shown in FIG. 2. The multi-tenant data analysis system 100 presents user interfaces to allows users 110 to interact with the multi-tenant data analysis system 100 for analyzing data. A user may generate reports, view existing reports, combine data from different reports, and perform various operations such as slicing and dicing of the report data, drill down, rollup and so on to analyze the data. A report may represent one or more data fields associated with the customer. A data field stores a particular type of data value associated with the customer. In an embodiment, a data field may be stored as a column of a database table storing data of the customer.

In an embodiment, the reports 130 represent data or information of a customer organized in a particular way so as to provide insights into activities of the customer. For example reports describing sales of a business may provide insights indicating which products have better sales than other products, the trends of the sales, future predictions of the sales, breakdown of sales based on various criteria such as geographical regions, sales regions, product categories, and the like. The data analysis based on the reports 130 allows the users to make informed decisions related to the customer. For example, a business executive may use a report 130 to make decisions regarding how to distribute/redistribute resources among different products, projects, or campaigns. In an embodiment, a report is stored as a database table or a temporary database table. Other embodiments may store a report using other data structures or representations.

A user 110 interacts with reports 130 to extract appropriate information that the user needs for data analysis. The interactions of the user 110 may result in new reports being generated based on existing reports. For example, a user may interact with one or more existing reports to focus on certain portions of a report, combine a report with other reports, visualize the data of the report in certain manner, modify parameters associated with a report, compare data of a report with another report, compare a portion of data of the report with another portion of data of the same report, and so on.

The recommendation engine 150 analyzes actions taken by various users of the multi-tenant data analysis system 100 performing data analysis to make recommendations regarding potential actions that a user can perform in a particular context. As an example, assume that user 110e associated with customer 120c is interacting with reports describing data of customer 120c. Further assume that the user 110e performed a sequence of interactions with the multitenant multi-tenant data analysis system 100 to arrive at a particular report or data field presented as a particular chart. The multi-tenant data analysis system 100 analyzes past user interactions that match the sequence of interactions of the user. The multi-tenant data analysis system 100 identifies what actions users in the past have taken after generating a report similar to that generated by the user based on the sequence of interactions. The multi-tenant data analysis system 100 uses these past interactions of users to make recommendations to the user of user actions that the user can perform to further analyze the data of the report generated by the user.

Accordingly, the multi-tenant data analysis system 100 facilitates the process of performing data analysis by the users based on actions taken by other users in contexts similar to the current context of the user. In other words, the multi-tenant data analysis system 100 makes recommendations to a user associated with a customer indicating how the user can further analyze the data of the customer presented to the user based on past actions of other users that were presented to similar data of their respective customers.

This is distinct from conventional systems that analyze the data for the user and present the final conclusion based on the analysis to the user. The multi-tenant data analysis system 100 allows the user to control the specific steps that the user performs for analyzing the data. The multi-tenant data analysis system 100 makes recommendations at each step of the data analysis indicating how other users in the past have further analyzed the type of data presented to the user. The multi-tenant data analysis system 100 lets the user choose a particular recommendation or ignore the recommendations and take a different action. Accordingly, the multi-tenant data analysis system 100 uses the collective intelligence of the user base of the multi-tenant data analysis system 100 to facilitate every step of data analysis performed by a user.

FIG. 2 shows details of the various components of the overall system environment of a multi-tenant data analysis system shown in FIG. 1, according to an embodiment. FIG. 2 provides further details of individual components shown in FIG. 1 as well as additional components. As shown in FIG. 2, customers 120 provide data stored in the multi-tenant data analysis system 100 and users 110 interact with the multi-tenant data analysis system 100 using client devices 205.

A client device 205 can be a conventional computer system (e.g., a desktop or laptop computer), a tablet, or a device having computer functionality such as a personal digital assistant (PDA), a mobile telephone, a smartphone or another suitable device. The client device 205 includes a client application 210 that allows the user 110 to interact with the multi-tenant data analysis system 100. The client application 210 presents user interfaces configured by the multi-tenant data analysis system 100 to the user. The client application 210 allows the user to interact with the multi-tenant data analysis system 100 by interacting with the widgets of the user interfaces presented to the user. The client application 210 forwards requests from the user based on user interactions with the user interfaces to the multi-tenant data analysis system 100.

The multi-tenant data analysis system 100 provides report data to the client application 210 for presentation to the user and receives commands provided by the users via the client application 210, for example, commands for performing data analysis. The client application 210 may visualize the report data received from the multi-tenant data analysis system 100, for example, as charts. In an embodiment, the client application 210 presents report data received from multi-tenant data analysis system 100 as interactive charts that allow the user to modify parameters of the chart or generate new reports based on the report underlying the chart.

In an embodiment, the client application 210 is a browser application that interacts with the multi-tenant data analysis system 100 via a network, for example, the Internet. In other embodiments, the client application 210 is a custom application designed and developed for interaction with the multi-tenant data analysis system 100. In some embodiments, the client application 210 interacts with the multi-tenant data analysis system 100 using an application programming interface (API) of the multi-tenant data analysis system 100.

The customer 120 includes one or more database systems 225 that store data of the customer. The database system 225 updates data stored in the database system 225 on a regular basis based on processing performed by systems of the customer 120. For example, sales information of a business associated with the customer 120 may be updated on a regular basis as sales transactions occur. The database system 225 stores data in a source database 235 and manages the data stored in the source database 235. Computer systems of a customer 120 store and provide identification information used to authenticate one or more of the users 110 that have access to the reports and data associated with the customer 120 stored in the multi-tenant data analysis system 100.

The customer 120 provides data stored in the source database 235 to the multi-tenant data analysis system 100. The data may be provided as a snapshot of the data stored in the source database 235, as transaction logs describing actions taken by the database system 225 of the customer, or as a combination of the two. The customer 120 may send the data of the source database 235 to the multi-tenant data analysis system 100 repeatedly, for example, on a periodic basis based on a predefined schedule.

The multi-tenant data analysis system 100 stores data obtained from each customer in a data store 250. FIG. 2 shows the data of customer 120a stored in data store 250a. However the various data stores 250, for example, 250a, 250b, . . . , 250n shown in FIG. 2 represent a logical division of data. For example, the data of different customers may be stored on the same physical hardware. In some embodiments, data of different customers may be stored in the same data structure, for example, the same set of tables. In such embodiments, the data of each customer is distinguished from data of other customers based on a field stored in the table that uniquely identifies each customer.

The multi-tenant data analysis system 100 further stores metadata 240 associated with each customer 120. The metadata 240 associated with each customer describes the data of the customer. For example, the multi-tenant data analysis system 100 may use a database schema for storing data of each customer. The metadata 240 maps data fields of the customer with data fields of the database schema of the multi-tenant data analysis system 100 used to store data of the customer.

In an embodiment, the multi-tenant data analysis system 100 stores information defining categories of customers based on various factors including types of products associated with a business, type of business model, type of industry in which the customer sells products/services, and so on. The metadata 240 associates each customer with one or more categories. Associating customers with categories allows the multi-tenant data analysis system 100 to filter customers based on categories. The The metadata 240 allows the multi-tenant data analysis system 100 to match corresponding data fields of different customers. For example, customer 120a may identify a data field as number_of_messages whereas customer 120b may identify an equivalent data field as communications. The multi-tenant data analysis system 100 maps equivalent data fields of different customers using the metadata of each customer 120.

The multi-tenant data analysis system 100 includes the user interface manager 220 that configures for presentation information sent to the client application 210. In embodiment, the client application 210 is a browser and the user interface manager 220 configures markup language documents such as HTML (hypertext markup language) documents for presentation via the client application 210. In an embodiment, the user interface manager 220 renders charts visualizing report data for presentation via the client application 210.

In some embodiments, metadata 240 includes parameters provided by the customer 120 that are used by the multi-tenant data analysis system 100 to customize the presentation of reports via the client application 210. Accordingly, equivalent reports presenting the same set of data fields for different customers may be visualized differently by client applications 210 of different customers. Details of custom-branded analytic applications in a multi-tenant environment are described in U.S. patent application Ser. No. 14/051,469, filed on Oct. 11, 2013, which is hereby incorporated by reference in its entirety.

The recommendation engine 150 as described in connection with FIG. 1 determines recommendations of potential actions that can be taken by a user for analyzing a particular type of data presented to the user via the client application 210. The details of various components of the recommendation engine 150 are further shown in FIG. 3.

System Architecture

Figure 3:
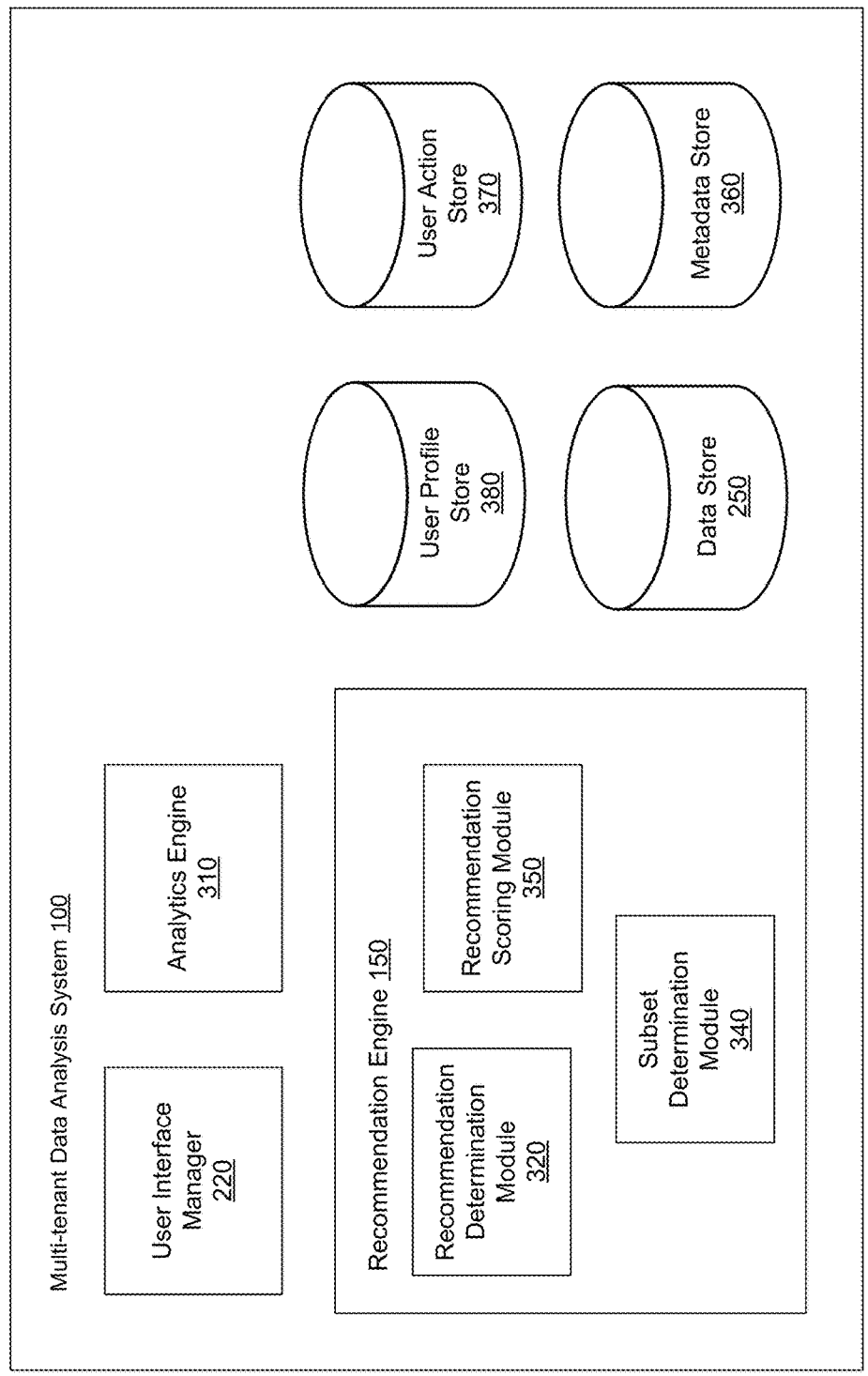
FIG. 3 shows a system architecture of a multi-tenant data analysis system, according to an embodiment.

FIG. 3 shows system architecture of a multi-tenant data analysis system, according to an embodiment. The multi-tenant data analysis system 100 includes user interface manager 220, analytics engine 310, recommendation engine 150, user profile store 380, user action store 370, metadata store 360, and data store 250. The data store 250 and user interface manager 220 are described in connection with FIG. 2 above. The metadata store 360 stores metadata 240 as described in connection with FIG. 2. In other embodiments, the multi-tenant data analysis system 100 may include other components or modules. Furthermore, any functionality described herein may be implemented by a different module than the module indicated herein.

The data store 250 stores data provided by the different customers. The data stored in the data store 250 includes the data received from the customer as well as reports generated by the analytics engine 310 for the customer. The metadata store 360 stores metadata 240 describing the data stored in the data store 250. The metadata 240 includes access control information, customized parameters for various reports and attributes, and information describing different attributes/data fields of the customer data including relations between attributes/data fields, types of data stored in each data field and so on. In an embodiment, the multi-tenant data analysis system 100 associates each report with a report identifier.

In an embodiment, the multi-tenant data analysis system 100 allows users to register with the multi-tenant data analysis system 100 by providing user information. The user information of the users of the multi-tenant data analysis system 100 are stored in the user profile store 380. In an embodiment, the user profile store 380 stores a user profile for each user. The user profile for a user includes information identifying the user for example, the user's name, or any other identification information.

The user profile also includes information identifying the customer associated with the user. The user profile may include demographic information describing the user including the location of the user, age of the user, education of the user, and so on. The user profile may include the designation of the user indicating the role of the user within the organization of the customer, for example, designation indicating that the user is an execution such as a CEO (chief executive officer), CTO (chief technology officer) or a CFO (chief financial officer), or that the user is a data analyst or a data scientist, of a quality assurance person, a developer, and so on. The various user profile attributes allow the multi-tenant data analysis system 100 to filter user actions based on various attributes describing the user so as to make recommendations based on past actions performed by a specific subset of users.

The user action store 370 stores information describing various actions taken by users. The user interface manager 220 provides information describing the various actions taken by the users to the user action store 370. The user interface manager 220 determines a context for each user action and associates the context with the user action. The user action store 370 stores a user identifier that identifies the user that performed a user action along with the user action. The user profile information can be combined with the user action store using the user identifier, thereby allowing the multi-tenant data analysis system 100 to determine subsets of user actions based on specific user actions.

The user action store 370 represents the context associated with a user action using a signature. The signature of a context includes the various reports presented to the user in a predetermined order (for example, increasing order of the report identifier value, or an alphabetic order of the name of the report.) The signature of the context includes specification of any filters applied to the reports. The filter may be specified using a canonical representation of an expression. The canonical representation of the expression is serialized and included in the signature. The signature of the context also includes any user interactions performed by the user with a report since the report was presented to the user. Each type of user interaction is associated with an interaction identifier.

The user interactions are encoded within the signature as a sequence of interaction identifiers. In an embodiment, the user action store 370 represents a sequence by storing a marker in the signature indicating that a sequence is starting in the signature, followed by the size of the sequence, followed by the interaction identifiers corresponding to each interaction.

In an embodiment, the multi-tenant data analysis system 100 determines a hash value based on a signature representing a context. The hash value represents an identifier for the context that is unique with a very high probability. All user actions that were previously performed by users of the multi-tenant data analysis system 100 in a similar context are associated with the same signature and have the same hash value. Accordingly, all user actions that were taken by users of the multi-tenant data analysis system 100 in the past when presented with information corresponding to the same context can be determined by matching the current context of the user with the contexts of the past interactions. The contexts can be matched by performing a comparison of the signature or by comparison of the hash value corresponding to the signature.

The analytics engine 310 generates different types of reports. The analytics engine 310 processes data stored in data store 250 in response to requests made by a user via the client application 210. The analytics engine 310 performs different types of processing including preparing reports based on user specifications as well as processing of previously prepared reports, for example, determining subsets of reports, combining reports, and so on. In an embodiment, the analytics engine 310 processes reports specified using a query language, for example the structured query language (SQL). Other embodiments may support other languages, for example, programming languages processing data structures representing information of customers. The different types of analysis performed by the analytics engine 310 include comparing two or more reports, determining trends, determining contribution of various components of data by displaying a bar with multiple stacks, each stack showing a percentage/fraction contribution associated with that section of the bar. The query language statements for analytics reports are stored and processed by the analytics engine but are typically not exposed to the user 110 interacting with the data analysis system 100. The data analysis system 100 presents name and description of analytics reports to the user. Upon request from the user, the data analysis system 100 executes the underlying queries and presents the result of the report to the user. Various user actions may result in different query language statements being executed by the analytics engine 310 without requiring the user to provide or even understand the query language statements being executed.

The recommendation engine 150 determines and makes recommendations to a user performing data analysis suggesting subsequent actions that the user can take in a given context. The recommendation engine provides information describing the recommendations for a user in a given context to the user interface manager 220. The user interface manager 220 identifies one or more widgets to be presented to the user via the client application 210 based on the recommendation and presents the identified widgets to the user via the client application 210. In an embodiment, the recommendation engine 150 determines a recommendation as a weighted combination of decisions taken based on user interactions of a global community, an organization associated with the customer of the user, and the specific user performing the action.

The recommendation engine 150 comprises different modules including a recommendation determination module 320, a subset determination module 340, and a recommendation scoring module 350. Other embodiments may include more, less, or different modules within the recommendation engine 150. Furthermore, functionality indicated herein as being performed by a particular module may be performed by other modules instead.

The recommendation determination module 320 determines recommendations of user actions that a user can take in a given context. The recommendation determination module 320 receives information describing the user context from the user interface manager 220. The information describing the context includes the report or data being currently presented to the user and/or a sequence of interactions between the user and the report or data. The recommendation determination module 320 determines recommendations of possible user actions that the user can take in the given context and provides the recommendations to the user interface manager 220. The recommendation determination module 320 provides the recommendations to the user interface manager 220 so that the user interface manager 220 can modify the user interface presented to the user to display the recommendations of actions and provide the user with the necessary widgets to take the recommended actions.

In an embodiment, a widget presented based on a recommendation allows a user to take a plurality of actions based on a single user action. For example, the data analysis system may collect a sequence of user actions that users have taken in the past in a given context and associate the sequence of user actions with the widget presented to the user. If the user wanted to take equivalent user actions without the widget presented based on the recommendation, the user would have to use multiple widgets and take multiple user actions (by clicking on different widgets or taking appropriate user actions associated with these widgets.) The data analysis system 100 packs the plurality of user actions in a single widget, thereby simplifying the user interaction for the user. The user interface presented by the data analysis system presents the user with a undo and redo button that allows the user to undo the recommended action and redo the recommended action (after performing undo operation.) The data analysis system stores the previous state of the system to allow the user to undo the complete set of actions associated with the widget based on the recommendation.

The recommendation scoring module 350 determines recommendation scores for recommendation. The user interface manager 220 uses the scores associated with the recommendation to configure the user interface presented to the user, for example, by configuring the appearance of the widgets corresponding to the recommendations presented to the user. The recommendation scoring module 350 determines scores for recommendation based on various factors. The factors used for determining score for a recommendation include the success rate of the recommendation as measured by how often users accepted the recommendation in the past when presented with the recommendation.

In an embodiment, the recommendation scoring module 350 determines the score for a recommendation of a user action in a given context as a weighted aggregate value based on the past occurrences of the user action. The recommendation scoring module 350 may weigh the user action based on a level of expertise of the user taking the past user action, the level of experience that the user has analyzing data using the multi-tenant data analysis system 100, the role of the user taking the action within the organization of the user, a success rate of user actions of the user in the past, and so on. For example, the recommendation scoring module 350 may give higher weights to user actions performed by users that are identified as expert data scientists higher than other users. The recommendation scoring module 350 gives higher weights to user actions performed by users with more experience performing data analysis using the multi-tenant data analysis system 100. The recommendation scoring module 350 may give higher weights to user actions performed by a user if recommendations based on the user have higher success rate (as measured by the rate at which other users accept the recommendations corresponding to the users actions.)

The recommendation determination module 320 determines the recommendations of actions based on past actions taken by subsets of users in a similar context. The recommendation determination module 320 invokes the subset determination module 340 to filter past user actions based on given criteria to determine subsets of user actions. In an embodiment, the subset determination module 340 determines user actions of subsets of users, for example, actions by users belonging to a particular customer or to a set of customers, actions by users belonging to a particular industry, user actions by users having a particular role within their organization, actions by users having a particular education/qualification, actions by users having a particular level of experience that a user has analyzing data using the multi-tenant data analysis system, and so on. The subsets of users used for determining recommendations for a user may be specified by the user as a configuration parameter. Alternatively, the subset of users may be configured for a specific customer such that the subset is determined for all users associated with that customer.

In an embodiment, the recommendation determination module 320 maintains a set of attributes for each context. The attribute may describe information of the user (experience of user, role of the user in the given project, etc.), information of the reports being analyzed (whether the report has a timestamp column, whether the report is associated with other reports, the depth of hierarchy based on relations between the reports, and so on), information of the project or workspace that the user is working in (metadata of the project including keywords describing the project, a category associated with the project based on a predefined hierarchy of categories, the depth of hierarchy of relations between database tables of the project, and so on), the organization associated with the customer of the user (e.g., the industry of the organization.), and other attributes. The data analysis system 100 identifies related user actions based on matching of the context based on these parameters. The data analysis system 100 weighs various factors differently for purposes of matching contexts. The data analysis system 100 adaptively changes the weights of different factors based on a success rate of recommendations that were made using given weights of the factors. In an embodiment, the weights associated with the various factors are determined based on machine learning. The data analysis system 100 trains a machine learning model with features based on the various factors described herein. The data analysis system 100 provides training data for machine learning model based on past user actions.

In an embodiment, the data analysis system 100 maintains weights of various features used to determine recommendations. The weights of the features are maintained for sets of users satisfying certain properties (also referred to as a category of users or a cluster of users satisfying certain properties or characteristics of attributes.) The data analysis system 100 characterizes each user by a set of attributes, each attribute associated with categories of values. For example, an attribute may represent the role of the user in the organization and categories of the role attribute include executive, data analysts, developer, and so on. The data analysis system 100 maintains weights of features for various combinations of the attributes categorizing users. The data analysis system 100 associated a user with the category of users (by mapping the values of the user attributes to the categories associated with the attributes). The data analysis system 100 uses the weights identified for the category associated with the user for determining recommendations for the user.

The data analysis system 100 regularly updates the weights associated with each category of users. In an embodiment, the data analysis system 100 receives values of the weights from an expert. In other embodiments, the data analysis system 100 modifies the weights by performing a self-tuning operation. The data analysis system 100 performs self-tuning by incrementally modifying the weights and receiving feedback on the quality of recommendations based on the modified weights (based on success rate of the recommendations based on the modified weights.) If the feedback indicates that the new weights improve the quality of recommendation, the data analysis system 100 keeps the new weights or else the data analysis system 100 reverts back to the previous weights and tries a different combination of weights.

In an embodiment, the subset determination module 340 filters user actions based on a time of the day that the user action is taken. This is significant for users working in different time zones since different types of users are active at different times during the day. In an embodiment, the subset determination module 340 filters user actions taken during a specific time interval, for example, user actions taken after an event associated with a customer such as release of a product or earnings release.

In an embodiment the recommendation determination module 320 determines specific subsets for specific types of contexts. For example, the multi-tenant data analysis system 100 determines recommendations based on different subsets of users for a particular type of report. The multi-tenant data analysis system 100 determines an aggregate measure of the success rate of different subsets. The success rate of a recommendation is determined based on the rate at which the recommendation is selected by a user when presented with the recommendation. The multi-tenant data analysis system 100 associates the contexts associated with the report with the types of subsets that are determined to be most successful. For example, the multi-tenant data analysis system 100 may determine that recommendations based on subsets of users belonging to a particular industry are more successful for a type of report whereas recommendation based on a wider user base are more successful for another type of report.

In an embodiment, the data analysis system 100 allows customers to define projects. A project (or a workspace) is associated with a set of users performing data analysis for related tasks. For example, a project may concern analyzing data for re-focusing resource allocated for a product. The recommendation determination module 320 giver higher weights to past actions of users in the same project as the project associated with the current context of a user compared to past user actions from different projects. In an embodiment, the recommendation determination module 320 identifies matching projects based on attributes of the project and gives higher weights to user actions performed in matching projects compared to user actions of non-matching projects.

In an embodiment, the data analysis system 100 matches projects based on various attributes describing the projects. The data analysis system 100 matches projects based on the type of data or types of reports of the project. The data analysis system 100 matches data based on relation between various entities represented in the project. An attribute describing the type of data is the depth of hierarchy of relations between entities. For example, if the database schema used in a project has relations (such as foreign keys), the data analysis system 100 matches projects based on the depth of hierarchy based on such relations. For example, the data analysis system 100 is likely to recommend user actions including drilldown and rollup if the depth of hierarchy of the project is big. Similarly, the data analysis system 100 is likely to recommend user actions showing trending reports if the project includes database tables with timestamp columns (and the reports used in a given context process such database tables.)

In an embodiment, the data analysis system 100 stores metadata describing projects, for example, various keywords describing the project or keywords describing the specific reports or tables of the database schema of the project. The data analysis system 100 matches metadata of projects to identify similar projects and gives higher weights to user actions from these projects. For example, a user working on a project with geographical data gets recommendations based on user actions taken by users from other projects with geographical data. For example, a user analyzing data of a project with geographical data is likely to get recommendations associated with geographical charts. Similarly, the data analysis system 100 provides users analyzing data for projects with sales/marketing information with recommendations thata re sales/marketing specific, for example, funnels, pipelines, and cohort analysis.

The user interface manager 220 configures for presentation various user interfaces to a user via the client application 210. The user interface manager 220 receives interactions of users with the user interface and determines the type of processing that needs to be performed in response to the user interaction. The user interface manager 220 invokes an appropriate module of the multi-tenant data analysis system 100 for processing the user interaction. The user interface manager 220 may configure a different user interface for presenting via the client application 210 based on the processing of the user interaction. In an embodiment, the user interface manager 220 modifies the user interface currently presented to the user, for example, by adding one or more widgets to the user interface. The one or more widgets added to the user interface are determined based on user actions performed by other users that were presented with a similar user interface displaying similar report or data via the client application 210.

In an embodiment, the user interface manager 220 receives a recommendation score for each recommendation received from the recommendation engine 150. The user interface determines parameters of a widget corresponding to a recommendation based on the recommendation score. The user interface manager 220 displays the widgets in accordance with the parameters determined. Examples of widgets displayed by the user interface manager 220 based on recommendations include buttons, URLs (uniform resource locators), drop zones that take an action when an icon representing a report or dataset is dragged and dropped in the drop zone.

In an embodiment, the user interface manager 220 determines the size of the widget based on the recommendation score for the recommendation. For example, a widget based on a recommendation having a higher recommendation score is displayed as a larger widget compared to a widget based on a recommendation having a lower recommendation score. As an example, if the user interface manager 220 identifies two drop zones to display based on recommendations, the drop zone for the recommendation with higher recommendation score is displayed as a larger drop zone compared to the drop zones based on recommendations having lower recommendation score.

In an embodiment, the user interface manager 220 determines the presentation of a text associated with a widget based on the recommendation score for the recommendation. For example, the text for a widget based on a recommendation having a higher recommendation score is displayed more prominently compared to a widget based on a recommendation having a lower recommendation score. The user interface manager 220 may make the text associated with a widget more prominent compared to other text by displaying the text using a bigger font, by using a specific color for the text, or by making the text distinct compared to other text by making the text bold, italicized, or underlined while the other text is displayed without these features as plain text.

In an embodiment, the user interface manager 220 determines the location within the user interface at which a widget is presented based on the recommendation score for the recommendation. For example, a widget based on a recommendation having a higher recommendation score is presented within the user interface at a location that is more accessible and convenient to the user compared to other locations. A location may be determined to be more convenient and accessible if the location requires less cursor movement for performing the user action associated with the widget. For example, if a widget is activated by dragging an icon and dropping the icon within the widget, a location that requires less movement for the icon is determined by the user interface manager 220 to be more convenient for the user.

In some embodiments, the user interface manager 220 displays a border around a widget, for example, a drop zone. The user interface manager 220 determines the presentation of the border around the widget based on the recommendation score of the recommendation associated with widget. For example, the border of a widget based on a recommendation with a higher recommendation score is displayed more prominently compared to the border of a widget based on a recommendation with a lower recommendation score. The user interface manager 220 displays a border more prominently by making the border thicker, having a brighter color, flashing, or having a darker texture compared to a border of another widget.

In an embodiment, the user interface manager 220 determines the number of widgets that are presented to the user in a given context based on the recommendation scores of the recommendations received from the recommendation engine 150. For example, if the user interface manager 220 receives more recommendations having high recommendation scores (i.e., having recommendation scores higher than a threshold value), the user interface manager 220 presents more widgets to the user compared to a situation in which the user interface manager 220 receives very few recommendation having high recommendation scores.

As an example, assume that the user interface manager 220 receives five recommendations, all having high recommendation scores, the user interface manager 220 may present 4 widgets corresponding to the highest scoring recommendations. On the other hand, if the user interface manager 220 receives five recommendations with only two recommendations having high recommendation scores and the remaining having low recommendation scores, the user interface manager 220 presents only two widgets corresponding to the two high scoring recommendations.

The user interface manager 220 determines the type of visualization for a particular report and configures the report data based on the visualization for presenting to the user via the client application 210. For example, the user interface manager 220 determines based on the type of report, whether to visualize the report as a bar chart, stacked bar chart, line chart, double line chart, triple line chart, pie chart, grouped bar chart displaying related bars side by side, or simply present the data as a table. In an embodiment, the user interface manager 220 receives the type of visualization to be used for a report from the recommendation engine 150 as part of the specification of the recommendation of the next user action. In other words, the recommendation engine 150 determines the type of visualization based on past visualizations of the users in matching contexts.

In some embodiments, the components of the multi-tenant data analysis system 100 are distributed across different computer systems. For example, the data store 250 storing customer data may be on a computer system different from the computer system executing the recommendation engine 150. In some embodiments, the data store 250 may be distributed across multiple computing systems. Similarly, the recommendation engine 150 may be executed using a parallel or distributed architecture that allows determining recommendations for different users in parallel.

User Interfaces for Performing Data Analysis

Figure 4:
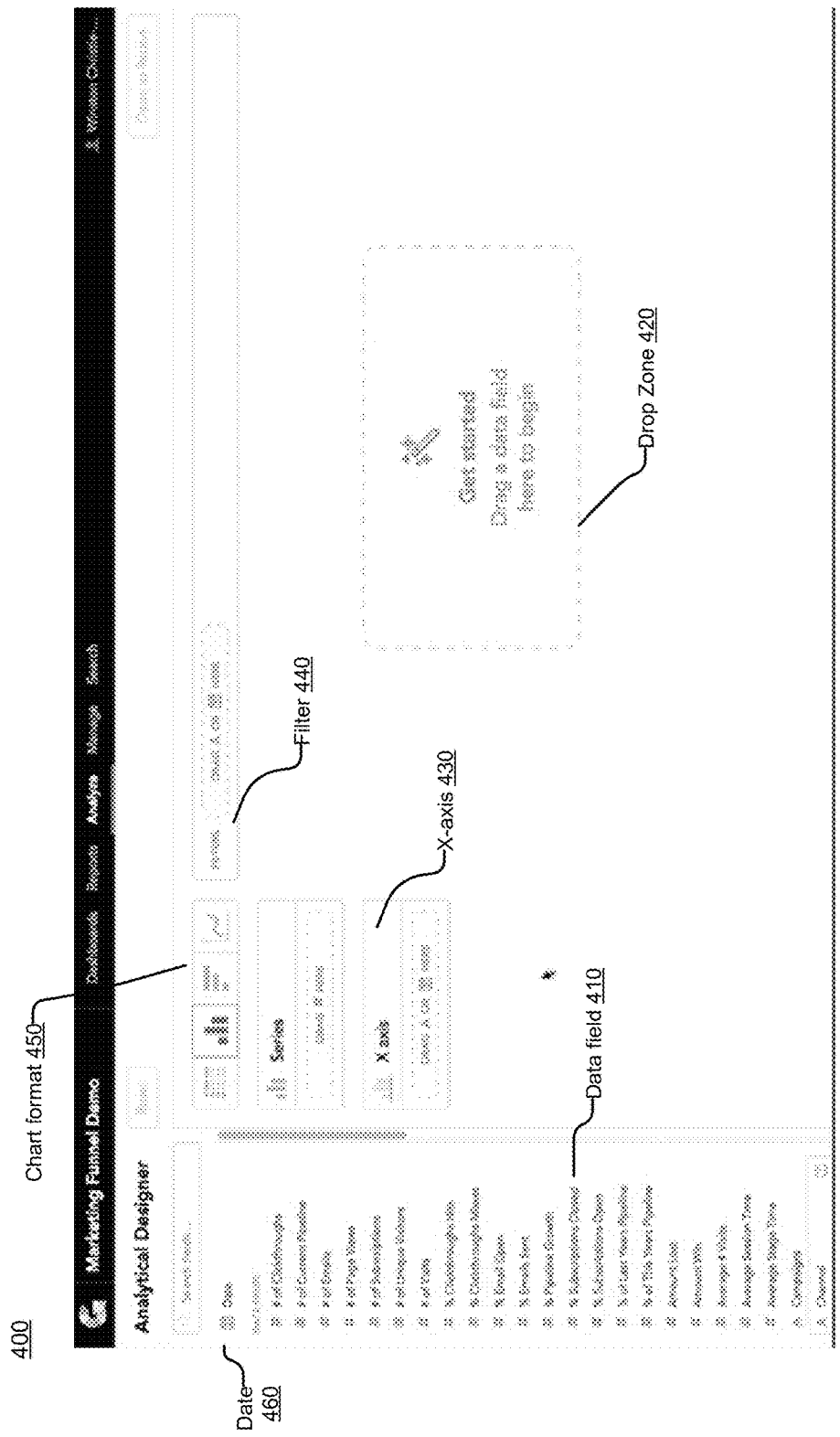
FIG. 4 shows a screenshot of a user interface presenting various data fields of the customer associated with a user that are available for analysis to the user, according to an embodiment.

FIG. 4 shows a screenshot of a user interface presenting various data fields of the customer associated with a user that are available for analysis to the user, according to an embodiment. The user interface 400 allows a user to view data of a customer stored on the multi-tenant data analysis system 100. The user may interact with the user interface 400 to view existing reports, create new reports, and perform various operations for analyzing a report. The widgets shown for each user interface described herein are exemplary and may be replaced with equivalent widgets. Accordingly, functionality described here for user interface 400 (or other user interfaces described herein) may be implemented using widgets different from those shown in the screenshot (or screenshots.) The user interface manager 220 receives the various inputs provided by the user using the user interfaces shown in FIGS. 4-8, determines the action requested by the user, and invokes the appropriate module of the multi-tenant data analysis system 100 for processing the user request.

The user interface 400 shows various data fields 410 in a panel allowing the user to select any data field for analysis. The panel may include columns of predefined reports instead of data fields. A user may select an icon representing a data field 410 and drop the icon in the drop zone 420 to view data of the selected data field 410. The chart format 450 allows users to select a particular type of visualization for viewing data of a data field or report.

The user may select an x-axis 430 for displaying data of the selected data field 410. The user may select a data field for use as an x-axis by dragging an icon corresponding to that data field 410 from the left panel and dropping it on the widget 430. The user interface manager 220 configures for display a report based on a data field 410 selected using the drop zone 420 plotted against a data field 410 selected for the x-axis 430.

The user may select time as the x-axis by dragging and dropping the date 460 attribute on the x-axis 430. In an embodiment, the widget 430 allows the user to specify a time range for which a selected data field is plotted (for example, by using a calendar interface). In an embodiment, the values of the data fields 410 are associated with a time stamp corresponding to the time that the data was generated. For example, values associated with a sales transaction are associated with a timestamp corresponding to the time that the sales transaction was executed or values of various events generated by the external systems of a customer are associated with the time that the event occurred. If the user selects time as the x-axis, the user interface manager 220 plots the selected data field against the time associated with the values of the data field. The user may also provide criteria for filtering the data values of the data field using the filter 440. For example, the user may select a data field 410 and specify a filter stating that the user wants to view only the data values that are greater than a specified threshold or values occurring within a specified range.

Figure 5:
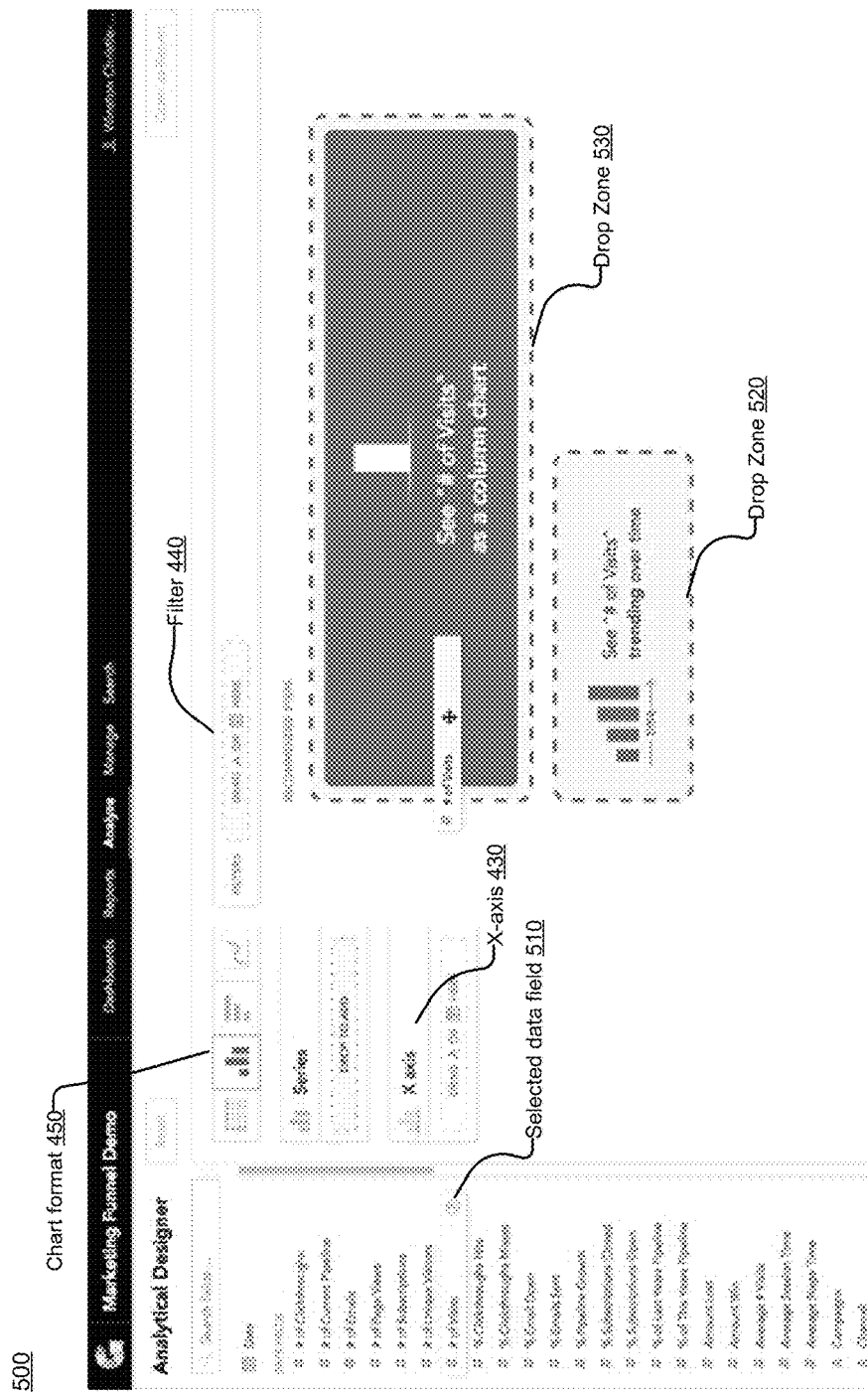
FIG. 5 shows a screenshot of a user interface showing different drop zones responsive to the user selecting a data field, each drop zone configured to allow the user to take a recommended action for the selected data field, according to an embodiment.

FIG. 5 shows a screenshot of a user interface showing different drop zones responsive to the user selecting a data field, each drop zone configured to allow the user to take a recommended action for the selected data field, according to an embodiment. The user provides a selection of a data field 510 using the user interface 500. The user interface manager 220 receives the selection of the data field 510. The user interface manager 220 sends a request to the recommendation engine 150 to generate recommendations of actions that the user can take based on the selected data field 510.

The recommendation engine 150 determines recommendations of actions that users have taken in the past after selecting the data field 510. The recommendation engine 150 may filter the user actions considered for making the recommendation, for example, by considering user actions taken within a time window (say recent most user actions), considering user actions of a subset of users, and so on. The recommendation engine 150 determines recommendations of user actions that the user can take for the selected data field 510 and sends the recommendations to the user interface manager 220. The recommendation engine 150 may recommend a type of visualization using the data field, for example, a type of chart that past users have used to view the selected data field 510. For example, as shown in FIG. 5, the recommendation engine 150 recommends visualizing the "# of visits" (i.e., the selected data field 510) as a column chart. The recommendation engine 150 may recommend a second data field against which the selected data field 510 may be plotted. For example, as shown in FIG. 5, the recommendation engine 150 recommends plotting the "# of visits" (i.e., the selected data field 510) trending over time.

The user interface manager 220 determines widgets that allow the user to take the recommended user actions and presents the widgets to the user via the user interface 500. As shown in FIG. 5, the user interface manager 220 presents the user interface 500 including two drop zones, each drop zone configured to perform a recommended action. In an embodiment, the user interface manager 220 receives recommendation scores for each recommended action and configures the widget based on the recommendation scores. For example, assume that the recommendation score of the first recommendation "viewing" the selected data field 510 as a column chart is higher than the recommendation score of the second recommendation viewing the selected data field 510 as trending over time. As shown in FIG. 5, the drop zone 530 of the first recommendation is displayed as being larger (or more prominently displayed) than the drop zone 520 of the second recommendation. The user interface manager 220 takes the user action that the user selects by dragging and dropping the selected data field 510 on any one of the drop zones 520 or 530. The user interface 500 also allows the user to ignore the recommendations and take a different user action using the widgets, for example, widgets 450, 440, 430, and so on.

Figure 6:
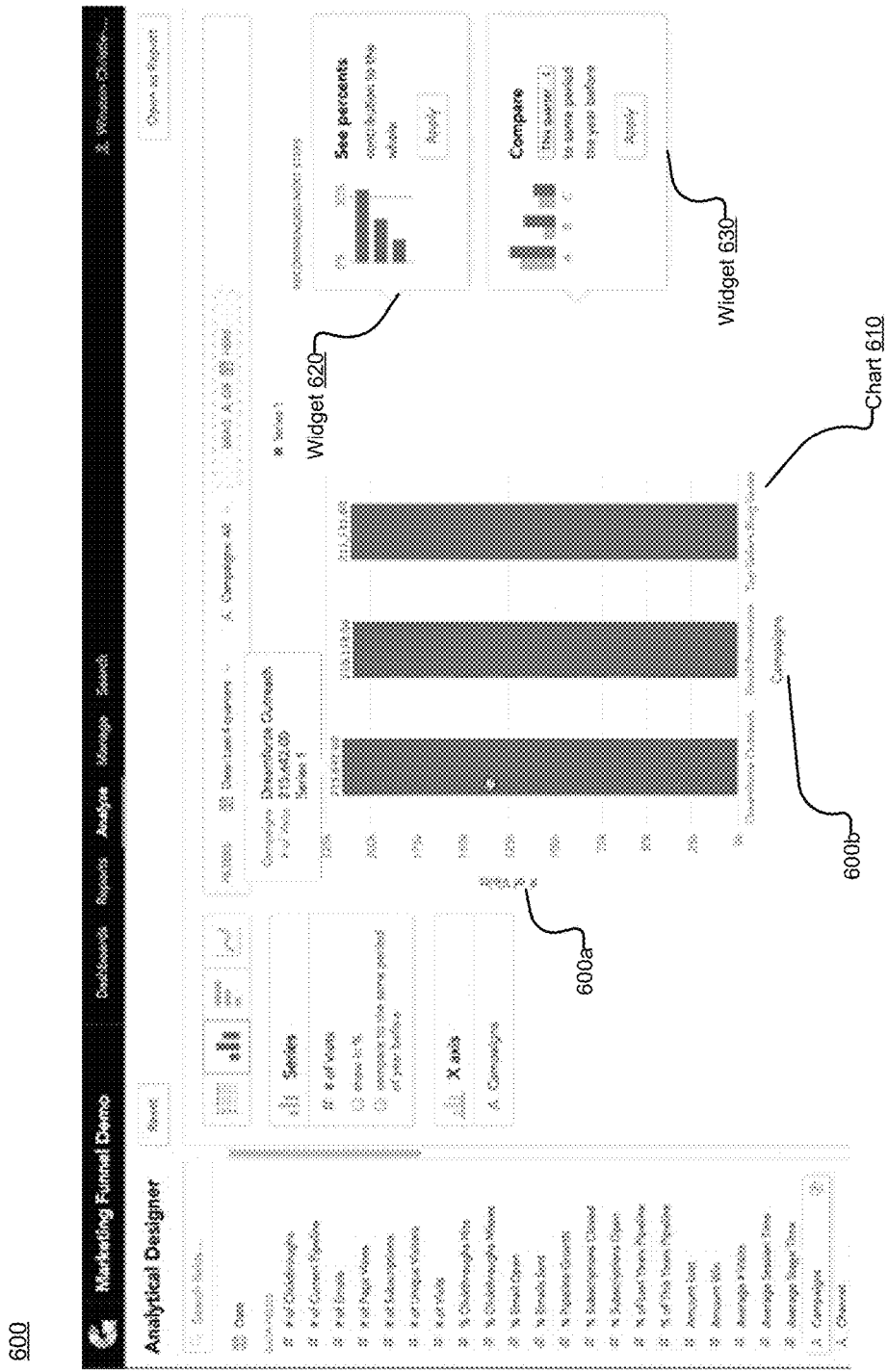
FIG. 6 shows a screenshot of a user interface showing different widgets allowing the user to take different recommended actions for analyzing data presented via the user interface, according to an embodiment.

FIG. 6 shows a screenshot of a user interface showing different widgets allowing the user to take different recommended actions for analyzing data presented via the user interface, according to an embodiment. As shown in FIG. 6, the user interface 600 shows a chart based on a first data field 600a plotted against a second data field 600b. The user interface manager 220 may have presented the chart 610 based on a sequence of user actions taken by the user. The recommendation engine 150 determines recommendations based on the sequence of user actions received by the user interface manager 220. The recommendation engine 150 provides the recommendations to the user interface manager 220. The user interface manager 220 presents widgets corresponding to each recommended user actions such that each widget is configured to allow the user to take a recommended user action. As shown in FIG. 6, widgets 620 and 630 allow the users to take the recommended user actions. The widget 620 allows the users to take the first recommended action of viewing percents of the selected data field as a contribution to the whole. The widget 630 allows the users to take the second recommended action of comparing the displayed values of the data field against the values of the data field for a different time period. Alternatively, a widget may allow the user to compare the selected data field against another data field. In an embodiment, the user interface manager 220 determines the order in which the widgets are displayed based on recommendation scores associated with the corresponding recommended action. For example, widgets corresponding to recommendations with higher recommendation scores may be displayed above the widgets corresponding to recommendations with lower recommendation scores.

Figure 7:
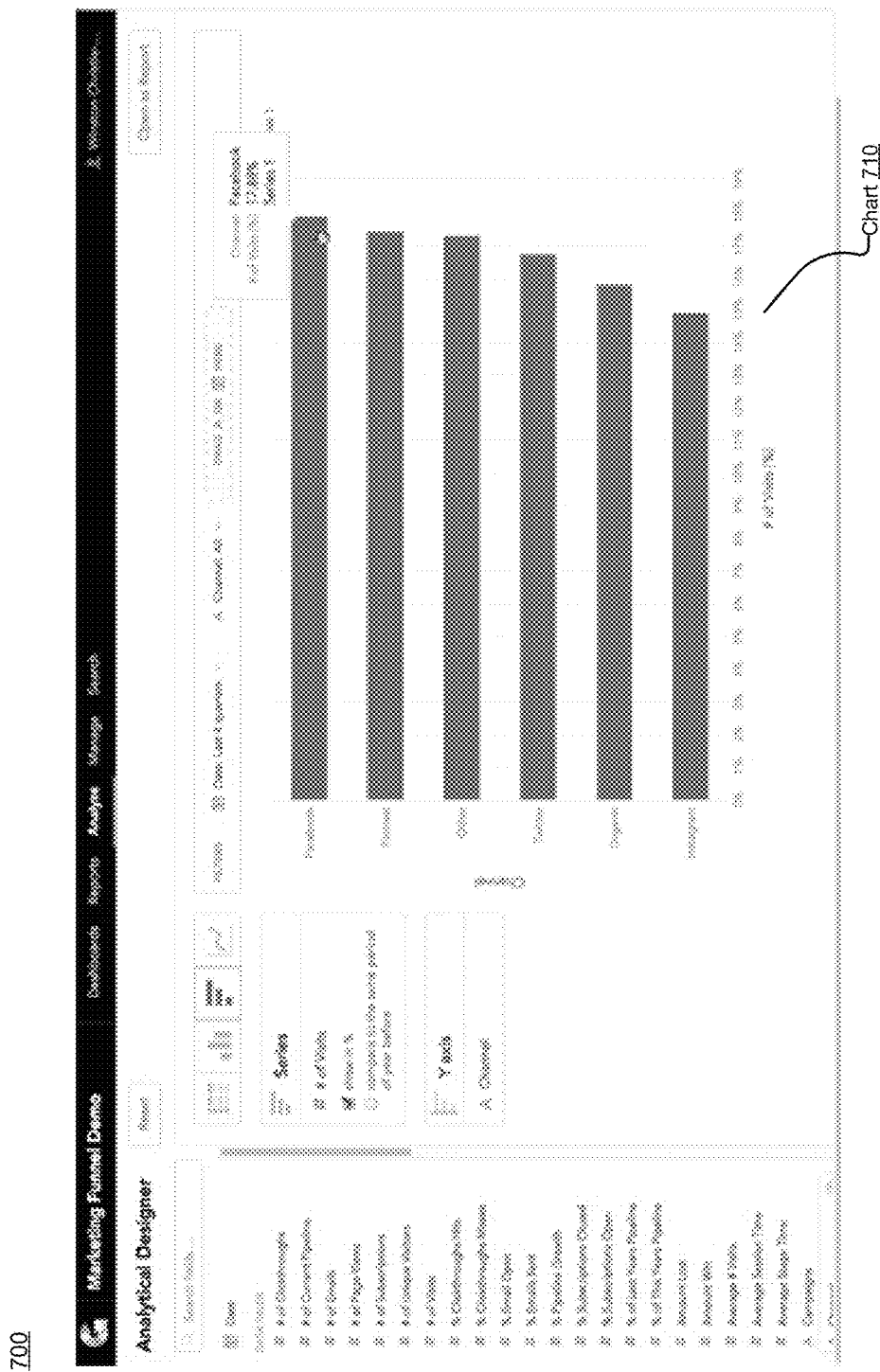
FIG. 7 shows a screenshot of a user interface showing a particular visualization responsive to user's selection of a particular widget corresponding to a recommended user action shown in FIG. 6, according to an embodiment.

FIG. 7 shows a screenshot of a user interface showing a particular visualization responsive to user's selection of a particular widget corresponding to a recommended user action shown in FIG. 6, according to an embodiment. The chart 710 shown in the user interface 700 is presented if the user selects the widget 620 requesting the multi-tenant data analysis system 100 to show the selected data field as percents of the whole. In an embodiment, the user interface manager 220 selects the type of chart used for presenting the requested information based on past user actions.

Figure 8:
FIG. 8 shows a screenshot of a user interface showing a particular visualization responsive to user's selection of a particular widget corresponding to a recommended user action shown in FIG. 6, according to an embodiment.

FIG. 8 shows a screenshot of a user interface showing a particular visualization responsive to user's selection of a particular widget corresponding to a recommended user action shown in FIG. 6, according to an embodiment. The chart 810 shown in the user interface 800 is presented if the user selects the widget 630 requesting the multi-tenant data analysis system 100 to show comparison of the selected data field against the same time period of a year ago.

Process of Recommending User Actions

Figure 9:
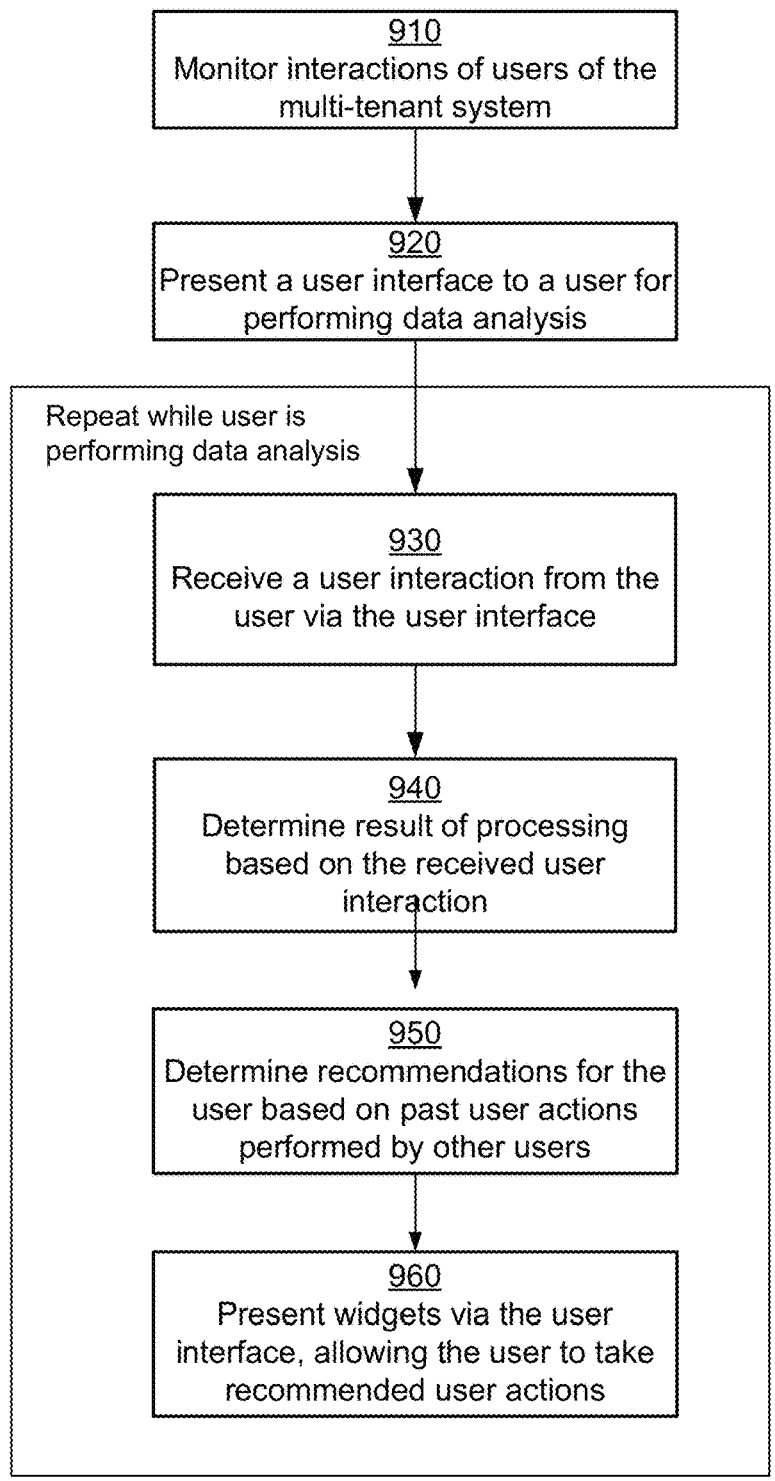
FIG. 9 shows a flowchart illustrating the overall process of performing data analysis based on recommendations of user actions based on collective intelligence, according to an embodiment.

FIG. 9 shows a flowchart illustrating the overall process of performing data analysis based on recommendations of user actions based on collective intelligence, according to an embodiment. Various steps shown in the flowchart may be processed in an order different from that indicated in FIG. 9. For example, certain steps may be processed in parallel.

The multi-tenant data analysis system 100 monitors 910 interactions of users of the multi-tenant system made for performing data analysis. A users of the multi-tenant data analysis system 100 may review reports related to the customer associated with the user and perform various types of analysis of the report data, for example, filtering the data, comparing the report with another report, comparing a portion of the report with another portion of the report, changing the visualization of the report, and so on. The multi-tenant data analysis system 100 stores these interactions in the data store 250. The multi-tenant data analysis system 100 further associates an interaction with a context in which the user performed the interaction. The context may be specified by identifying the report with which the interaction was performed, one or more interactions performed by the user to get to the present user interface, the type of visualization of the report presented to the user via the client application 210, and so on.

The user interface manager 220 configures for presenting a user interface to the user for performing data analysis. The user interface manager 220 sends information describing the user interface to the client application 210 and the client application 210 presents 920 the user interface to the user. The user interface presents various widgets that allow the user to perform data analysis.

The multi-tenant data analysis system 100 repeats the following steps while the user performs the data analysis. The user interface manager 220 receives 930 a user interaction from the user via the user interface. For example, if the user is starting the data analysis process, the user may select a report for performing the analysis. In subsequent iterations, the user interaction may depend on the context of the user, for example, the type of report presented to the user, the types of interactions performed by the user using the report so far, and so on. The user interaction received 930 may be based on a recommendation presented to the user by a previous iteration.

The analytics engine 310 determines 940 the result of processing based on the user interaction. Accordingly, the analytics engine 310 performs the processing requested by the user using the user interaction. For example, if the user interaction requests filtering the report based on certain criteria, the analytics engine 310 performs the filtering operation. Similarly, if the user interaction corresponds to comparing the report data with another report, the analytics engine 310 performs the comparison operation and generates a new report based on the result of the comparison operation.

Figure 10:
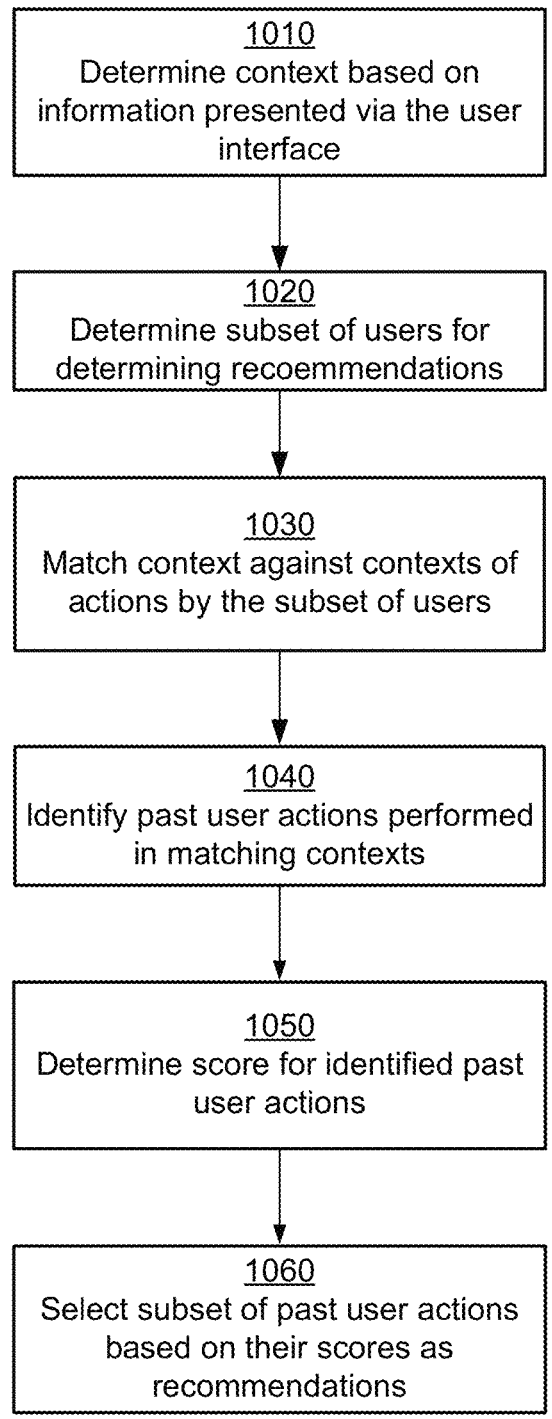
FIG. 10 shows a flowchart illustrating a process for determining recommendations of user actions for presenting to a user performing data analysis according to the process of FIG. 9, according to an embodiment.

The recommendation engine 150 further determines 950 one or more recommendations of potential user actions that the user can take subsequently. Details of how the recommendation engine 150 determines 950 the recommendations are illustrated in FIG. 10. The recommendation engine 150 sends the recommendations to the user interface manager 220.

The user interface manager 220 identifies widgets corresponding to each recommendation to be presented to the user. The identified widget allows the user to perform the recommended user action specified in the recommendation. The user interface manager 220 reconfigures the user interface presented to the user to display the identified widgets. The user interface manager 220 presents 960 the identified widgets via the user interface of the client application 210 to the user.

The steps 930, 940, 950, and 960 of the process are repeated as long as the user performs the data analysis. In other words, the multi-tenant data analysis system 100 to receives a user interaction, determine result of the requested processing based on the received user interaction, determines recommendations of potential user actions that the user can take for the resulting data, and reconfigures the user interface to present the results as well as widgets based on the recommendations. These steps are repeated while the user performs the data analysis.

FIG. 10 shows a flowchart illustrating a process for determining recommendations of user actions for presenting to a user performing data analysis according to the process of FIG. 9, according to an embodiment. Various steps shown in the flowchart may be processed in an order different from that indicated in FIG. 10. For example, certain steps may be performed in parallel.

The recommendation determination module 320 determines a context based on the data presented to the user via the user interface of the client application 210. The recommendation determination module 320 uses various factors to determine the context including the report or reports currently presented to the user, the interactions performed by the user with the currently presented reports, and so on. In an embodiment, the recommendation determination module 320 determines a signature based on the context by encoding the information of the context. The recommendation determination module 320 maps the signature of the context to a unique value, for example, a hash value.

The recommendation determination module 320 invokes the subset determination module 340 to determine 1020 subsets of users to be considered for making recommendations. The recommendation determination module 320 matches 1030 context of the user against context associated with past user actions performed by users of the subset. The recommendation determination module 320 identifies 1040 past user actions that were performed by users in matching contexts.

The recommendation scoring module 350 determines 1050 recommendation scores corresponding to the past user actions identified 1040. The recommendation determination module 320 ranks the past user actions based on their recommendation scores. The recommendation scoring module 350 selects 1060 a subset of the past user actions based on their scores. For example, the recommendation scoring module 350 may select all past user actions that are determined to have more than a threshold recommendation score value. Alternatively, the recommendation scoring module 350 may select a predetermined number of past user actions having the highest recommendation scores. The recommendation scoring module 350 uses the selected 1060 user actions to be the recommendations to be presented to the user in the present context of the user.

Alternative Embodiments

Techniques described herein can be used for making recommendations in other types of actions taken by user performing activities associated with business intelligence. For example, techniques described herein can be used for making recommendations of user actions for other data analysis related tasks performed by users. For example, the data analysis system 100 can make recommendations for users building dashboards describing the reports for the organization of the user or for a specific project of the user. The dashboard provides a user interface that presents various relevant reports and organizes them within a single user interface to provide key information related to the project/organization at a quick glance. The data analysis system 100 can make recommendations for helping user build the dashboard based on collective intelligence of other users. These recommendations include types of reports that are included in the dashboard, given a report, type of visualization that should be used for the report, the amount of space used for displaying data of the report, the position of the report within the dashboard user interface, the type of color, widgets, and textual information presented for the report. Other tasks performed by users that the data analysis system 100 provides recommendations for include building data models for a project.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for recommending user actions for data analysis, the method comprising:
   storing, by a multi-tenant system, data received from a plurality of external systems, each external system associated with a customer of the multi-tenant system, each customer associated with one or more users;
   monitoring, by the multi-tenant system, user interactions performed by users of the multi-tenant system with reports, the monitoring comprising associating a user interaction with a context in which the user interaction is performed, the context identifying at least a report with which the user interaction was performed;
   performing, by the multi-tenant system, a sequence of interactions with the user, the performing of each interaction comprising:
     determining a recommendation comprising a potential sequence of computer-executable actions based on past user interactions performed by users of the multi-tenant system in contexts matching a context of the user, the matching contexts comprising sequences of the past user interactions, wherein the context of the user comprises a present sequence of user interactions performed by the user;
     determining a recommendation score for the recommendation, wherein determining the recommendation score comprises determining an aggregate value based on the past user interactions;
     responsive to determining the recommendation score for the recommendation, constructing a computer-actionable widget for the recommendation based on the recommendation score, and configuring a user interface comprising the computer-actionable widget, the widget comprising a compiled graphical user interface element configured to receive one or more user interactions associated with the recommendation and automatically execute the recommended sequence of potential computer-executable actions, the configuring of the user interface comprising:
       determining a value of an attribute of the widget based on the recommendation score of the recommendation associated with the widget, the attribute specifying one of:
         a size of the widget;
         a size of text associated with the widget; or
         an appearance of the widget; and
       configuring the computer-actionable widget, comprising, performing at least one of:
         scaling the size of the widget according to the determined value of the attribute;
         scaling the size of the text associated with the widget according to the determined value of the attribute; or
         configuring the appearance of the widget according to the determined value of the attribute; and
     receiving an interaction from the user based on the computer-actionable widget of the user interface.

2. The method of claim 1, wherein the recommendation score for the recommendation is determined based on factors including a number of times interactions matching the user interaction were performed by users in the past for a matching context.

3. The method of claim 1, wherein the recommendation score for the recommendation is determined based on a rate at which the recommendation was selected by users in the past when presented with the recommendation.

4. The method of claim 1, wherein the recommendation score for the recommendation is determined based on a weighted combination of rate at which a user action associated with the recommendation was taken by one or more of:
   the user for whom the recommendation is determined;
   an organization associated with the customer of the user; and
   a user base based on a plurality of customers.

5. The method of claim 1, further comprising displaying a first computer-actionable widget associated with a first recommendation to be larger than a second computer-actionable widget associated with a second recommendation if the recommendation score of the first recommendation is higher than the recommendation score of the second recommendation.

6. The method of claim 1, further comprising displaying a first computer-actionable widget associated with a first recommendation with a more prominent border compared to a second computer-actionable widget associated with a second recommendation if the recommendation score of the first recommendation is higher than the recommendation score of the second recommendation.

7. The method of claim 1, further comprising displaying a first computer-actionable widget associated with a first recommendation using a larger text compared to text of a second computer-actionable widget associated with a second recommendation if the recommendation score of the first recommendation is higher than the recommendation score of the second recommendation.

8. The method of claim 1, further comprising:
   determining a number of computer-actionable widgets presented to the user based on the recommendation scores of determined recommendations.

9. The method of claim 1, further comprising:
   determining a subset of users of the multi-tenant system; and
   wherein the recommendation comprising the potential sequence of computer-executable actions is determined based on past user interactions of the subset of users.

10. The method of claim 9, wherein the subset of users is determined based on a role of the users in an organization of the customer associated with the user.

11. The method of claim 9, wherein the subset of users is determined based on a type of industry of the customer associated with the user.

12. The method of claim 9, wherein the subset of users is determined based on a measure of experience of the user in performing data analysis using the multi-tenant system.

13. The method of claim 1, wherein a context further comprises a sequence of most recent interactions performed by the user.

14. The method of claim 1, wherein a context further comprises a visualization of the report presented to the user via the user interface.

15. The method of claim 1, wherein a context further comprises one or more other reports presented to the user along with the report via the user interface.

16. The method of claim 1, wherein a context further comprises a time associated with the user interaction.

17. The method of claim 1, wherein a user interaction with a report processes the report to generate a new report.

18. The method of claim 1, wherein a user interaction with a report compares data of the report with data of another report.

19. The method of claim 1, wherein a user interaction with a report compares a portion of data of the report with another portion of data of the report.

20. A non-transitory computer-readable storage medium storing instructions for:
storing, by a multi-tenant system, data received from a plurality of external systems, each external system associated with a customer of the multi-tenant system, each customer associated with one or more users;
monitoring, by the multi-tenant system, user interactions performed by users of the multi-tenant system with reports, the monitoring comprising associating a user interaction with a context in which the user interaction is performed, the context identifying at least a report with which the user interaction was performed;
performing, by the multi-tenant system, a sequence of interactions with the user, the performing of each interaction comprising:
determining a recommendation comprising a potential sequence of computer-executable actions based on past user interactions performed by users of the multi-tenant system in contexts matching a context of the user, the matching contexts comprising sequences of the past user interactions, wherein the context of the user comprises a present sequence of user interactions performed by the user;
determining a recommendation score for the recommendation, wherein determining the recommendation score comprises determining an aggregate value based on the past user interactions;
responsive to determining the recommendation score for the recommendation, constructing a computer-actionable widget for the recommendation based on the recommendation score, and configuring a user interface comprising a computer-actionable widget, the widget comprising a compiled graphical user interface element configured to receive one or more user interactions associated with the recommendation and automatically execute the recommended sequence of potential computer-executable actions, the configuring of the user interface comprising:
determining a value of an attribute of the widget based on the recommendation score of the recommendation associated with the widget, the attribute specifying one of:
a size of the widget;
a size of text associated with the widget; or
an appearance of the widget; and
configuring the computer-actionable widget, comprising, performing at least one of:
scaling the size of the widget according to the determined value of the attribute;
scaling the size of the text associated with the widget according to the determined value of the attribute; or
configuring the appearance of the widget according to the determined value of the attribute; and
receiving an interaction from the user based on the computer-actionable widget of the user interface.

21. The non-transitory computer-readable storage medium of claim 20, wherein the recommendation score for the recommendation is determined based on factors including a number of times interactions matching the user interaction were performed by users in the past for a matching context.

22. The non-transitory computer-readable storage medium of claim 20, wherein the recommendation score for the recommendation is determined based on a rate at which the recommendation was selected by users in the past when presented with the recommendation.

23. The non-transitory computer-readable storage medium of claim 20, wherein the recommendation score for the recommendation is determined based on a weighted combination of rate at which a user action associated with the recommendation was taken by one or more of:
the user for whom the recommendation is determined;
an organization associated with the customer of the user; and
a user base based on a plurality of customers.

24. The non-transitory computer-readable storage medium of claim 20, wherein the context associated with the user further comprises one or more of:
a sequence of most recent interactions performed by the user;
a visualization of the report presented to the user via the user interface;
one or more other reports presented to the user along with the report via the user interface; or
a time associated with the user interaction.

25. A computer system comprising:
a processor; and
a non-transitory computer-readable storage medium storing instructions for execution by the processor, the instructions for:
storing, by a multi-tenant system, data received from a plurality of external systems, each external system associated with a customer of the multi-tenant system, each customer associated with one or more users;
monitoring, by the multi-tenant system, user interactions performed by users of the multi-tenant system with reports, the monitoring comprising associating a user interaction with a context in which the user interaction is performed, the context identifying at least a report with which the user interaction was performed;
performing, by the multi-tenant system, a sequence of interactions with the user, the performing of each interaction comprising:
determining a recommendation comprising a potential sequence of computer-executable actions based on past user interactions performed by users of the multi-tenant system in contexts matching a context of the user, the matching contexts comprising sequences of the past user interactions, wherein the context of the user comprises a present sequence of user interactions performed by the user;
determining a recommendation score for the recommendation, wherein determining the recommendation score comprises determining an aggregate value based on the past user interactions;
responsive to determining the recommendation score for the recommendation, constructing a computer-actionable widget for the recommendation based on the recommendation score, and configuring a user interface comprising the computer-actionable widget, the widget comprising a compiled graphical user interface element configured to receive one or more user interactions associated with the recommendation and automatically execute the recommended sequence of potential computer-executable actions, the configuring of the user interface comprising:

determining a value of an attribute of the widget based on the recommendation score of the recommendation associated with the widget, the attribute specifying one of:
a size of the widget;
a size of text associated with the widget; or
an appearance of the widget; and
configuring the computer-actionable widget, comprising, performing at least one of:
scaling the size of the widget according to the determined value of the attribute;
scaling the size of the text associated with the widget according to the determined value of the attribute; or
configuring the appearance of the widget according to the determined value of the attribute; and
receiving an interaction from the user based on the computer-actionable widget of the user interface.

26. The computer system of claim 25, wherein the recommendation score for the recommendation is determined based on factors including a number of times interactions matching the user interaction were performed by users in the past for a matching context.

27. The computer system of claim 25, wherein the recommendation score for the recommendation is determined based on a rate at which the recommendation was selected by users in the past when presented with the recommendation.

28. The computer system of claim 25, wherein the recommendation score for the recommendation is determined based on a weighted combination of rate at which a user action associated with the recommendation was taken by one or more of:
the user for whom the recommendation is determined;
an organization associated with the customer of the user; and
a user base based on a plurality of customers.

29. The computer system of claim 25, wherein the context associated with the user further comprises one or more of:
a sequence of most recent interactions performed by the user;
a visualization of the report presented to the user via the user interface;
one or more other reports presented to the user along with the report via the user interface; or
a time associated with the user interaction.

* * * * *